US009374207B2

(12) United States Patent
Lamazure et al.

(10) Patent No.: US 9,374,207 B2
(45) Date of Patent: Jun. 21, 2016

(54) MOBILITY MANAGEMENT IN A MULTI-SUBSCRIBER IDENTITY MOBILE DEVICE

(75) Inventors: Samuel Lamazure, Moutiers (FR); Jean-Christophe Batllo, Rennes (FR)

(73) Assignee: ST-ERICSSON SA, Plan-les-Ouates (CH)

( * ) Notice: Subject to any disclaimer, the term of this patent is extended or adjusted under 35 U.S.C. 154(b) by 220 days.

(21) Appl. No.: 14/124,088

(22) PCT Filed: May 24, 2012

(86) PCT No.: PCT/EP2012/059771
§ 371 (c)(1),
(2), (4) Date: Feb. 10, 2014

(87) PCT Pub. No.: WO2012/168090
PCT Pub. Date: Dec. 13, 2012

(65) Prior Publication Data
US 2014/0169347 A1 Jun. 19, 2014

Related U.S. Application Data

(60) Provisional application No. 61/504,007, filed on Jul. 1, 2011.

(30) Foreign Application Priority Data

Jun. 8, 2011 (EP) .................................. 11305712

(51) Int. Cl.
*H04L 5/00* (2006.01)
*H04B 17/382* (2015.01)
(Continued)

(52) U.S. Cl.
CPC ............ *H04L 5/0037* (2013.01); *H04B 17/327* (2015.01); *H04B 17/382* (2015.01); *H04W 76/025* (2013.01); *H04W 16/14* (2013.01); *H04W 48/12* (2013.01)

(58) Field of Classification Search
CPC .. H04B 17/382; H04B 17/327; H04L 5/0037; H04W 76/025
See application file for complete search history.

(56) References Cited

U.S. PATENT DOCUMENTS

2003/0125073 A1* 7/2003 Tsai ...................... H04W 68/02
455/552.1
2006/0072509 A1 4/2006 Lindoff et al.
(Continued)

OTHER PUBLICATIONS

International Search Report issued in corresponding International application No. PCT/EP2012/059771, date of mailing Jul. 9, 2012.
(Continued)

*Primary Examiner* — Un C Cho
*Assistant Examiner* — Peian Lou
(74) *Attorney, Agent, or Firm* — Patent Portfolio Builders PLLC

(57) ABSTRACT

The invention concerns a method of scheduling the reception of at least one System Information block by a mobile device being adapted to be associated with at least a first Subscriber Identity and a second Subscriber Identity, the System Information block being intended to the second Subscriber Identity and being broadcasted with a first periodicity over a network by at least one base station of the network in the form of a plurality of bursts, according to a given frame structure having TDMA frames, each TDMA frame comprising a plurality of time gaps, at least one first time gap of a first TDMA frame being allocated to communication activity on the first Subscriber Identity, at least one burst of the System Information block being broadcasted over the network during a second time gap of a second TDMA frame. If the first TDMA frame and the second TDMA frame are one and the same TDMA frame within the frame structure but if the second time gap is distinct from the first time gap within the TDMA frame, or if the second TDMA frame is distinct from the first TDMA frame, then the method comprises allocating the second time gap of the second TDMA frame to receive the burst of the System Information block.

15 Claims, 6 Drawing Sheets

(51) Int. Cl.
*H04B 17/327* (2015.01)
*H04W 76/02* (2009.01)
*H04W 48/10* (2009.01)
*H04W 48/12* (2009.01)
*H04W 16/14* (2009.01)
*H04W 56/00* (2009.01)
*H04W 72/04* (2009.01)
*H04W 88/02* (2009.01)

(56) References Cited

U.S. PATENT DOCUMENTS

| | | |
|---|---|---|
| 2007/0207824 A1 | 9/2007 | Bhattacharjee et al. |
| 2008/0084272 A1* | 4/2008 | Modiano .............. G07B 15/063 340/5.2 |
| 2008/0176563 A1 | 7/2008 | Lee et al. |
| 2009/0156257 A1 | 6/2009 | Shi |
| 2009/0191862 A1* | 7/2009 | Amirijoo .......... H04W 36/0083 455/424 |
| 2010/0322169 A1 | 12/2010 | Narasimha |

OTHER PUBLICATIONS

Written Opinion issued in corresponding International application No. PCT/EP2012/059771, date of mailing Jul. 9, 2012.

Etsi, Digital cellular telecommunications system (Phase 2+); Multiplexing and multiple access on the radio path (3GPP TS 45.002 version 6.10.0 Release 6), Jul. 2005.

* cited by examiner

MOBILITY MANAGEMENT IN A MULTI-SUBSCRIBER IDENTITY MOBILE DEVICE

BACKGROUND OF THE INVENTION

1. Technical Field

The present invention generally relates to third generation mobile system (3GPP) GSM/GPRS/EDGE wireless devices.

It finds applications, in particular, in Dual Subscriber Identity Module (SIM) products in Dual Standby mode (DSDS) and more generally in products comprising a plurality of Subscriber Identities.

2. Related Art

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

With DSDS architecture, when one SIM of a mobile phone is in communication, for example during a call or exchange of data, a high rate of network reception level is lost on the second SIM during mobility.

In this case, after the communication on the first SIM releases, several tens of seconds are necessary for the second SIM to camp back on the network and to be able to answer to a Mobile Terminated call (MT call) or to initiate a Mobile Originated call (MO call).

When one SIM responds to an entering communication, only reception power level monitoring and frequency and timing synchronization block decoding of the second SIM serving cells and neighbouring cells, which are selected before the entering communication is received, are possible. In what follows, FCH stands for frequency channel and SCH stands for synchronization channel.

Other activities are not permitted on the second SIM, thus resulting in a de-synchronization with Home Public Land Mobile Network (HPLMN), i.e. the network corresponding to a SIM operator, or with equivalent Public Land Mobile Network (PLMN), in some use cases such as roaming or limited service.

Thus, there is a need to quickly be able to initiate a MO call or to answer to a MT call on the second SIM after the first SIM communication release.

SUMMARY OF THE INVENTION

To address these needs, a first aspect of the present invention relates to method of scheduling the reception of at least one System Information block by a mobile device adapted to be associated with at least a first Subscriber Identity and a second Subscriber Identity, the System Information block being intended to the second Subscriber Identity and being broadcasted with a first periodicity over a network by at least one base station of the network in the form of a plurality of bursts, according to a given frame structure having TDMA frames, each TDMA frame comprising a plurality of time gaps, at least one first time gap of a first TDMA frame being allocated to communication activity on the first Subscriber Identity, at least one burst of the System Information block being broadcasted over the network during a second time gap of a second TDMA frame. If the first TDMA frame and the second TDMA frame are one and the same TDMA frame within the frame structure but the second time gap is distinct from the first time gap within the TDMA frame, or if the second TDMA frame is distinct from the first TDMA frame, then the method comprises allocating the second time gap of the second TDMA frame to receive the burst of the System Information block.

Specific Broadcast Common Control CHannel (BCCH) block decoding is not possible with the current state-of-the-art implementation, although it remains essential in order to guarantee the synchronization with Home Public Land Mobile Network (HPLMN), i.e. the network corresponding to a Subscriber Identity operator, or with equivalent PLMN. The BCCH block comprises network System Information (SI) and is thus necessary in order to quickly initiate a MO call or receive a MT call on the second Subscriber Identity after the first Subscriber Identity communication release.

Thus, embodiments of the present invention allow allocating time gaps within TDMA frames to perform additional activities on the second Subscriber Identity, and in particular, to perform System Information block reading. Thus, the connection with the HPLMN or with equivalent PLMN of the second Subscriber Identity is not lost during communication on the first Subscriber Identity and a call can be quickly initiated or received after the first Subscriber Identity communication release. In addition, the communication activity on the first Subscriber Identity is not degraded, given that time gaps allocated to receive SI block differ from time gaps allocated to first Subscriber Identity communication.

According to some embodiments of the invention, at least a third TDMA frame comprising at least one third time gap allocated to power measurements on the second Subscriber Identity and on the first Subscriber Identity, if the third TDMA frame and the second TDMA frame are one and the same TDMA frame and if the second time gap and the third time gap are the same within the TDMA frame, then another time gap is allocated to power measurements in the TDMA frame to allow allocating the second time gap to receive the burst of the System Information block.

Such embodiments enable to allocate time gaps to receive SI block bursts even in case of physical conflict with measurement activities on the first Subscriber Identity and on the second Subscriber Identity. Indeed, as these activities are initiated by the mobile device, other time gaps can be allocated to measurements without degrading a measurement quality.

In some embodiments of the invention, the frame structure comprising one empty TDMA frame sent periodically, if the first TDMA frame and the second TDMA frame are one and the same TDMA frame and if the first time gap and the second time gap are the same within the TDMA frame, then another burst of the System Information block is broadcasted over the network during at least a fourth gap of an empty TDMA frame and the fourth time gap of the empty TDMA frame is allocated to receive the other burst of the System Information block.

Thus, a duration of SI block burst reception can be predicted, for example by simply calculating a least common multiple based on the periodicity of transmission of SI block bursts in the network and on the periodicity of empty TDMA frames in the frame structure. Such embodiments also avoid considering any physical conflict between SI block reception and first Subscriber Identity communication.

According to some other embodiments, a discontinuous communication mode being activated on the device so that first time gap is actually used for communication only when communication data is received or transmitted on the first Subscriber Identity, if the first TDMA frame and the second TDMA frame are one and the same TDMA frame and if the first time gap and the second time gap are the same within the TDMA frame, then the second time gap of the TDMA frame is allocated to receive the burst of the System Information block if no communication data is received or transmitted for the first Subscriber Identity during the first time gap.

Such embodiments enable to use discontinuity in first Subscriber Identity communication to allocate time gaps to receive SI block bursts, in case of conflict between SI block reception and first Subscriber Identity communication.

According to some embodiments of the invention, if communication data is received or transmitted for the first Subscriber Identity during the first time gap, then an allocation to receive at least another burst of the System Information block of one of the next first periods is scheduled.

As the System Information block is periodically broadcasted over the network and as it comprises the same System Information, the reception of SI block can be re-scheduled to a next first period, for example when less speech data are transmitted or received during communication on the first Subscriber Identity, thus creating discontinuities in communication. Thus, communication on the first Subscriber Identity is not degraded by the SI block reception.

Alternatively, if communication data is received or transmitted for the first Subscriber Identity during the first time gap, then communication on the first Subscriber Identity may be temporally interrupted during the first time gap and the first time gap may be allocated to receive the burst of the System Information block.

Indeed, the reception of SI block can be imposed independently from the first Subscriber Identity communication, by temporally interrupting communication on first Subscriber Identity, which enables accelerating the reception of the SI block.

In some embodiments of the invention, a serving base station of the network is initially associated with the second Subscriber Identity, the network further comprises at least one neighbouring base station, communication on the first Subscriber Identity comprises data reception and data transmission, a block of a prefixed size comprises at least two first time gaps is allocated in at least one first TDMA frame to the communication on the first Subscriber Identity, the block of a prefixed size is divided in a first block and a second block, the first block comprises at least one first time gap allocated to data reception and the second block comprises at least one first time gap allocated to data transmission, an allocation to receive at least one burst of the System Information block of the serving base station is scheduled within the first block and an allocation to receive at least one burst of the System Information block of the neighbouring base station is scheduled within the second block.

Such embodiments allow spreading the allocations of time gaps between discontinuities in communication transmission and discontinuities in communication reception, to receive different SI from different base stations broadcasting SI blocks over the network.

According to some embodiments of the invention, if a limited delay to receive the System Information block is prefixed, a discontinuous communication mode being activated on the device so that first time gap is actually used for communication only when communication data is received or transmitted on the first Subscriber Identity, if the first TDMA frame and the second TDMA frame are one and the same TDMA frame and if the first time gap and the second time gap are the same within the TDMA frame, then communication on the first Subscriber Identity is temporally interrupted during the first time gap and the first time gap is allocated to receive the burst of the System Information block.

Thus, depending on predefined criteria, some embodiments of the invention can be dynamically selected. In this case, a delay being pre-fixed, reception of SI block bursts can be prioritized over communication on the first Subscriber Identity, which allows accelerating the reception of SI block bursts for the second Subscriber Identity on the mobile device.

Alternatively, if a quality level of the communication is initially required on the first Subscriber Identity, the frame structure comprising one empty TDMA sent periodically, if the first TDMA frame and the second TDMA frame are one and the same TDMA frame and if the first time gap and the second time gap are the same within said TDMA frame, then another burst of the System Information block is broadcasted over the network during at least a fourth time gap of an empty TDMA frame and the fourth time gap of the empty TDMA frame is allocated to receive the other burst of the System Information block.

If other criteria are prefixed, such as the quality level for first Subscriber Identity communication, other embodiments can be selected. Thus, all the previously described embodiments can be dynamically selected, depending on current criteria.

Alternatively or in addition, a number of bursts of a System Information block being required to decode the System Information, if a given number of System Information is badly decoded within a third time period, then emission by the mobile device of a Downlink Signalling Failure event is triggered.

Thus, downlink quality monitoring can be performed based on the decoding of the BCCH blocks containing the System Information.

Another aspect of the invention relates to a processor for scheduling the reception of at least one System Information block, the processor being adapted to be associated with a mobile device comprising at least a first Subscriber Identity and a second Subscriber Identity, the System Information block being intended to the second Subscriber Identity and being broadcasted with a first periodicity over a network by at least one base station of the network in the form of a plurality of bursts, according to a given frame structure having TDMA frames, each TDMA frame comprising a plurality of time gaps, at least one first time gap of a first TDMA frame being allocated to communication activity on the first Subscriber Identity, at least one burst of the System Information block being broadcasted over the network during a second time gap of a second TDMA frame, wherein the processor comprises a decision unit for determining if the first TDMA frame and the second TDMA frame are one and the same TDMA frame within the frame structure but the second time gap is distinct from the first time gap within the TDMA frame, or if the second TDMA frame is distinct from the first TDMA frame, an allocation unit for allocating the second time gap to receive at least one burst of a System Information block depending on the determination of the decision unit, a receiver unit for receiving the burst of the System Information block and a decoding unit for decoding the System Information of the System Information block.

Another aspect of the invention relates to a mobile device for scheduling the reception of at least one System Information block, the mobile device being adapted to be associated with at least a first Subscriber Identity and a second Subscriber Identity, the System Information block being intended to the second Subscriber Identity and being broadcasted with a first periodicity over a network by at least one base station of the network in the form of a plurality of bursts, according to a given frame structure having TDMA frames, each TDMA frame comprising a plurality of time gaps, at least one first time gap of a first TDMA frame being allocated to communication activity on the first Subscriber Identity, at least one burst of the System Information block being broadcasted over the network during a second time gap of a second TDMA frame. The mobile device comprises a processor, a decision unit for determining if the first TDMA frame and the second TDMA frame are one and the same TDMA frame within the frame structure but the second time gap is distinct from the first time gap within the TDMA frame, or if the second TDMA frame is distinct from the first TDMA frame, an allocation unit for allocating the second time gap to receive at least one burst of a System Information block depending on the determination of the decision unit, a receiver unit for receiving the burst of the System Information block and a decoding unit for decoding the System Information of the System Information block.

In some embodiments, the processor can be further configured to perform the steps of a method according to anyone of the embodiments of the first aspect of the invention.

Another aspect of the invention concerns a system for scheduling the reception of at least one System Information block by a mobile device of the system, the mobile device being adapted to be associated with at least a first Subscriber Identity and a second Subscriber Identity, the system further comprising at least one base station, the base station being adapted to broadcast with a first periodicity a System Information block intended to the second Subscriber Identity over a network, according to a given frame structure having TDMA frames, each TDMA frame comprising a plurality of time gaps, at least one first time gap of a first TDMA frame being allocated to communication activity on the first Subscriber Identity, at least one burst of the System Information block being broadcasted over the network during a second time gap of a second TDMA frame. The mobile device comprises a processor, the processor comprising a decision unit for determining if the first TDMA frame and the second TDMA frame are one and the same TDMA frame within the frame structure but the second time gap is distinct from the first time gap within the TDMA frame, or if the second TDMA frame is distinct from the first TDMA frame, an allocation unit for allocating the second time gap to receive at least one burst of a System Information block depending on the determination of the decision unit, a receiver unit for receiving the burst of the System Information block and a decoding unit for decoding the System Information of the System Information block.

According to some embodiments, the processor can be further configured to perform the steps of a method according to anyone of the embodiments of the first aspect of the invention.

Still another aspect of the invention concerns a computer program product comprising a computer readable medium having stored thereon computer program instructions loadable into a computing device and adapted to—when loaded into and executed by the computing device—cause the computing device to perform a method of anyone of the embodiments of the first aspect of the invention.

BRIEF DESCRIPTION OF THE DRAWINGS

Embodiments of the present invention are illustrated by way of example, and not by way of limitation, in the figures of the accompanying drawings, in which like reference numerals refer to similar elements and in which:

FIG. 3.b illustrates a timing diagram comprising time gaps allocated to communication and power measurements on the first Subscriber Identity and to power measurements on the second Subscriber Identity, according to some embodiments of the invention;

FIG. 3.c illustrates a timing diagram comprising time gaps allocated to communication and power measurements on the first Subscriber Identity and to BCCH block reading and power measurements on the second Subscriber Identity, according to some embodiments of the invention;

FIG. 5.b represents three timing diagrams respectively representing downlink DTX communication on the first Subscriber Identity, a user discontinuous audio speech on the loud speaker of the DSDS device, and transmissions of BCCH blocks for a first SI type and for a second SI type by a serving cell of the second Subscriber Identity;

FIG. 6.b represents two timing diagrams respectively representing downlink DTX communication on the first Subscriber Identity and transmissions of BCCH blocks for a first SI type and for a second SI type by the serving cell of the second Subscriber Identity;

DESCRIPTION OF PREFERRED EMBODIMENTS

Figure 1:
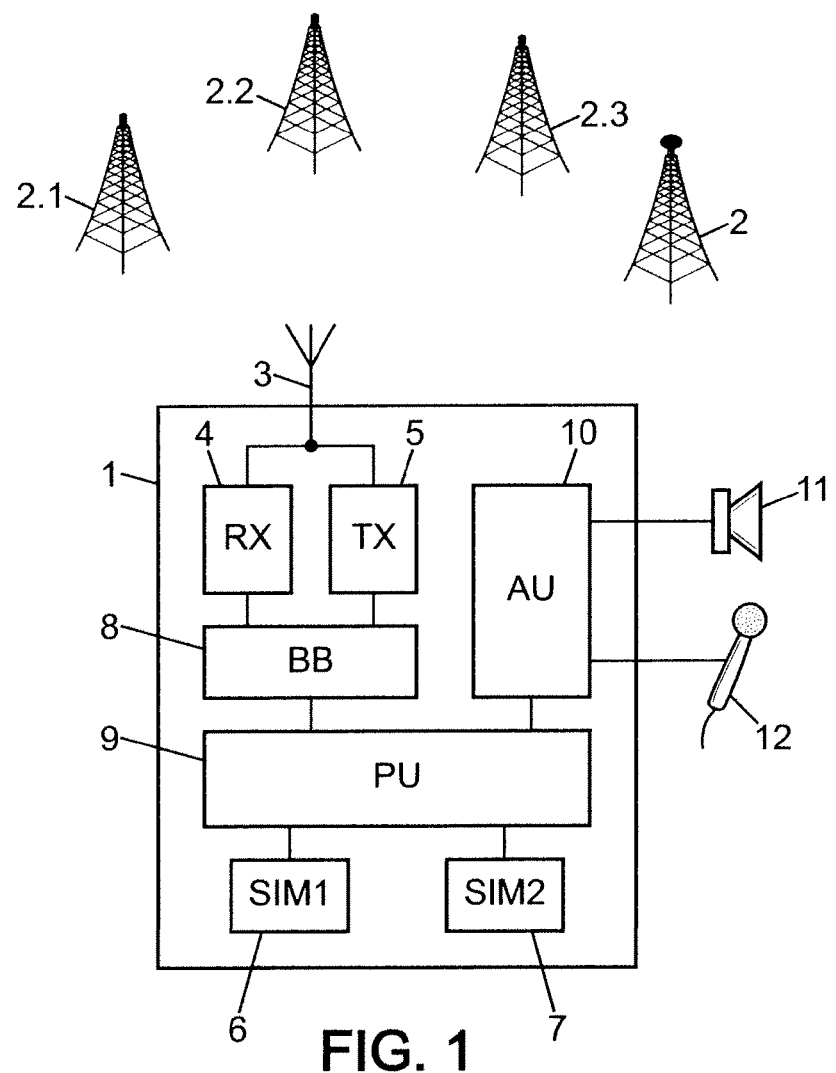
FIG. 1 illustrates a system comprising a device and a plurality of base stations, according to some embodiments of the invention.

Referring to FIG. 1, there is shown a system in a network according to some embodiments of the invention. The system comprises a device 1, such as a DSDS mobile phone, comprising a first SIM 6 and a second SIM 7. No restriction is attached to the type of device implementing embodiments of the invention. Indeed, embodiments of the invention include applications in Personal Digital Assistants (PDAs) or smartphones comprising at least two SIMs. Furthermore, it is noted that the first SIM 6 and the second SIM 7 are respectively associated with a first Subscriber Identity and a second Subscriber Identity. Although physical modules are used in the following description, the Subscriber Identities can also be associated with a virtual SIM or a stolen SIM, for example. In some embodiments, the first SIM 6 and the second SIM 7 are attached to a same service operator. In other embodiments, the first SIM 6 and the second SIM 7 are attached to different operators.

The system also comprises a plurality of Public Land Mobile Networks (PLMN) base stations 2, 2.1, 2.2, 2.3, each PLMN base station serving a given cell of the network. In the example detailed here, the PLMN base station 2 can be considered as the HPLMN base station of the first SIM 6 and of the second SIM 7. However, the first SIM 6 and the second SIM 7 may have different HPLMN base stations, for example in the case where they are attached to different operators. The HPLMN base station 2 is associated with the serving cell of the first SIM 6 and of the second SIM 7 and the PLMN base stations 2.1-2.3 can be associated with the neighbouring cells of the first SIM 6 and of the second SIM 7. However, as it will be illustrated on FIG. 2, neighbouring and serving cells of the first SIM 6 can differ from the neighbouring and serving cells of the second SIM 7.

The device 1 is adapted to communicate with any of the PLMN base stations 2, 2.1-2.3, via any wireless technique for example, by means of an antenna 3. The communication can be bidirectional and can be according to a given frame structure having Time Division Multiple Access (TDMA) frames, each TDMA frame comprising a plurality of time gaps that can be allocated to different activities.

The antenna 3 is connected to a reception unit 4 and to a transmission unit 5. The reception unit 4 is adapted to handle downlink data received from the PLMN base stations 2, 2.1-2.3 whereas the transmission unit is adapted to handle uplink data from the device 1 to the PLMN base stations 2, 2.1-2.3.

The reception unit 4 and the transmission unit 5 are connected to a Processing Unit (PU) 9 comprising a Digital Signal Processor (DSP) and a system controller, through a Base Band unit 8, which is adapted to convert downlink analogical data into numeric data to be transmitted to the PU 9 and which is adapted to convert uplink digital data into uplink analogical data to be transmitted to the PLMN base stations 2, 2.1-2.3.

The PU 9 is also connected to both first SIM 6 and second SIM 7 and to an audio unit 10. The audio unit 10 is connected to a speaker 11 and to a microphone 12, which form an interface to exchange speech data with a user of the device. However, no restriction is attached to the type of interface, which can also be digital or which can comprise a keyboard.

Figure 3A:
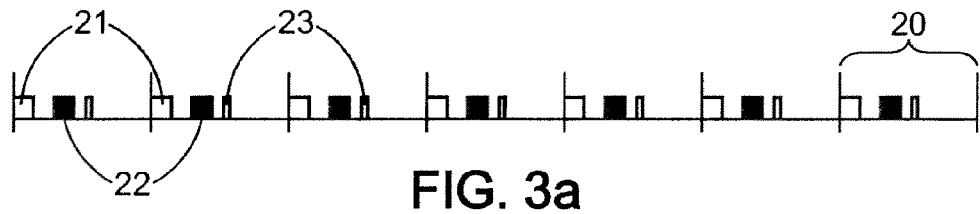
FIG. 3.a illustrates a timing diagram comprising time gaps allocated to communication and power measurements on the first Subscriber Identity.
Figure 3B:
Figure 3C:

Referring to FIG. 3.*a*, there is shown a timing diagram, time being divided in a series of TDMA frames 20. In each TDMA frame, time gaps can be allocated to perform activities of the first SIM 6, when the first SIM 6 is in communication, according to the 3GPP GSM recommendations. On the example illustrated on FIG. 3.*a*, the DSDS device 1 is in communication on its first SIM 6 during the at least seven TDMA frames 20 that are illustrated. To this end, time gaps are allocated to communication reception bursts 21, to communication transmission bursts 22 and to power measurements 23. All these activities are performed at the level of the first SIM 6. However, in the state of the art, there is no possibility for performing activities on the second SIM 7 of the DSDS device 1 while the first SIM 6 is in communication.

According to embodiments of the invention, on DSDS products, when the first SIM 6 is in communication, the second SIM 7 serving cell and neighbouring cells can be monitored in order to avoid losing the synchronization with the second SIM 7 HPLMN base station 2 and with equivalent PLMN base stations 2.1-2.3.

To this end, a plurality of activity types can be implemented at the level of the second SIM 7, such as reception power level monitoring, frequency and timing synchronizations, System Information block decoding, downlink quality monitoring and serving cell reselection handling. All these activities can possibly be performed when the second SIM 7 is in idle mode, according to embodiments of the invention. However, some of these activities can also be performed during neighbourhood network level coverage acquisition, initial serving cell synchronization and neighbourhood PLMN base stations 2, 2.1-2.3 scanning.

Embodiments of the present invention enable to perform cell reselections for the second SIM 7 during the first SIM 6 communication. In complement, once the first SIM 6 communication is released, a Location Area Update (LAU) procedure can be performed for the second SIM 7, according to the 3GPP GSM recommendations for example. The LAU is then accelerated insofar as the cell reselection has been previously performed and System Information block decoding was made that provide the paging configuration. The LAU is useful for a SIM to be located on its HPLMN or equivalent PLMN in order to be able to receive a MT call.

To this end, the five activity types mentioned above can be performed according to embodiments of the present invention. However, the five activity types can be performed independently according to embodiments of the invention and the improvement of one activity does not depend on improvements of other activities.

Concerning the reception power level monitoring, it is noted that in case of a single-SIM product architecture, this activity is implemented in a static way with respect of the 3GPP GSM recommendations.

In case of DSDS products, one object of embodiments of the invention is to enhance the monitoring algorithm in a dynamic way by adding measurements according to a total number of serving and neighbouring cells for both first SIM 6 and second SIM 7 and by fitting measurement physical positions according to the additional activities concerning the second SIM 7 requirements, such as the timing synchronization and the System Information block decoding for example. In some embodiments, adding and fitting measurements can be performed with respect of the 3GPP GSM recommendations, at least for the first SIM 6, thus implying that the additional activities do not degrade the first SIM 6 capabilities. The second SIM 7 could respect the 3GPP GSM recommendations in some use cases. It is also noted that in case of identical neighbouring cells for the first SIM 6 and for the second SIM 7, for example when they are attached to the same service operator, each measurement result is provided to both first SIM 6 and second SIM 7.

Indeed, referring to FIG. 3.*b*, there is shown a timing diagram, on which the references are similar to those used on FIG. 3.*a*. Time gaps are also allocated to power measurements 24 on the second SIM 2. As there is no physical conflict between communication reception bursts 21, communication transmission bursts 22, power measurements 23 on the first SIM 6 and power measurements 24 on the second SIM 7, the insertion of power measurements in "free" time gaps (meaning time gaps that have not been previously allocated to other activities) does not degrade the quality of communication on the first SIM 6.

Figure 2:
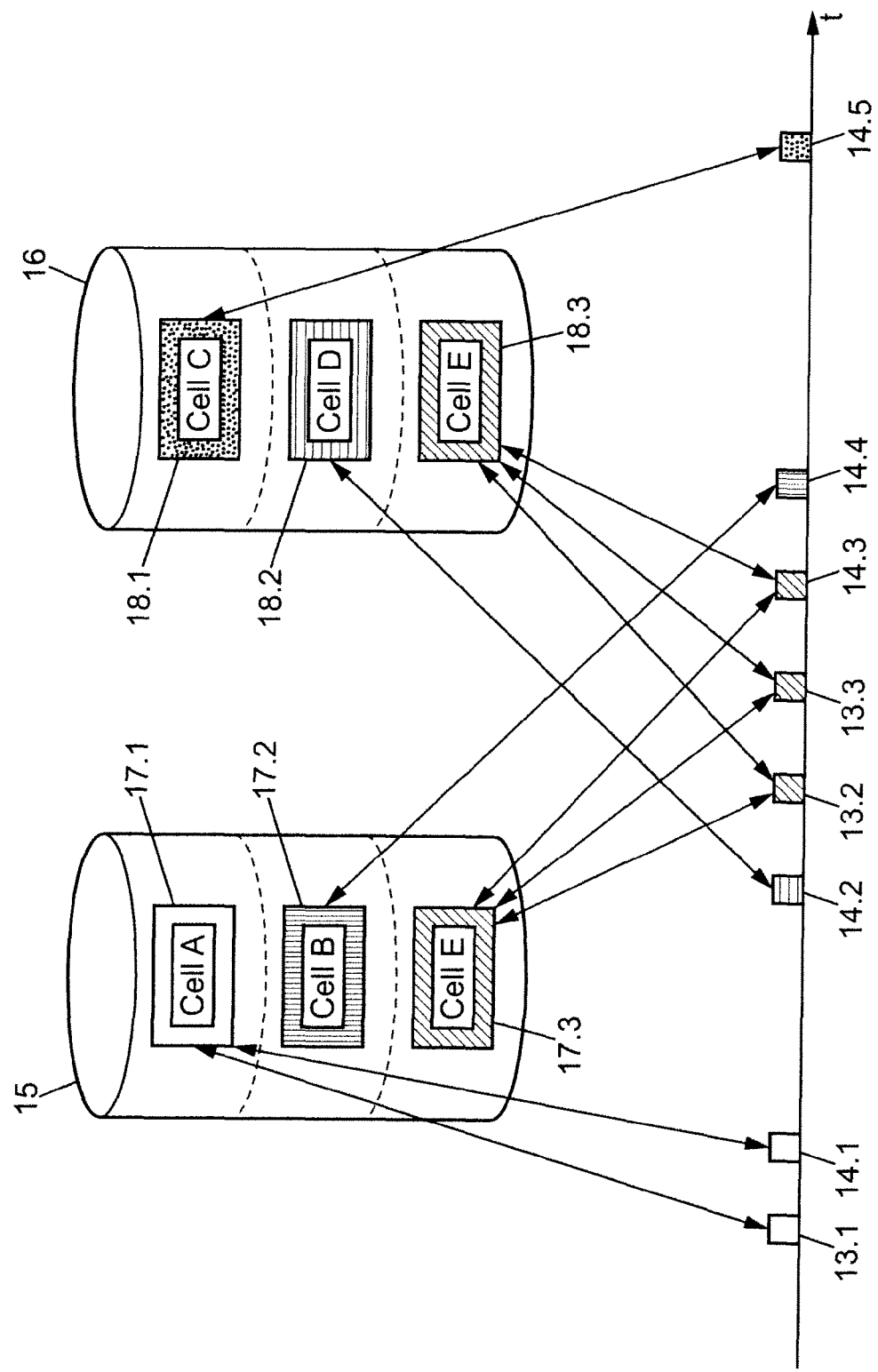
FIG. 2 represents a timing diagram comprising time gaps to perform frequency and timing synchronization according to some embodiments of the invention.

Concerning the frequency and timing synchronization, the same FCH and SCH decoding mechanism as the one used for single-SIM products can be kept. In addition to the first SIM 6 neighbouring cells, second SIM 7 neighbouring cells can be considered. In case of identical neighbouring cells for the first SIM 6 and for the second SIM 7, for example when they are attached to the same service operator or when the DSDS device 1 scans completely the neighbourhood whatever the PLMN is, each synchronization result can be provided to both first SIM 6 and second SIM 7. Referring to FIG. 2, there is shown a timing diagram, in which time gaps are allocated for FCH search 13 and for SCH reading 14 of different PLMN base stations, each PLMN base station corresponding to a cell of the network. In parallel, a first database 15 of the first SIM 6 and a second database 16 of the second SIM 7 are represented. The databases 15 and 16 store identifiers of neighbouring cells which are candidate for synchronization. Thus, database 15 comprises an identifier 17.1 of a cell A, an identifier 17.2 of a cell B and an identifier 17.3 of a cell E. Database 16 comprises an identifier 18.1 of a cell C, an identifier 18.2 of a cell D and an identifier 18.3 of cell E. In this example, only cell E is common to both first SIM 6 and second SIM 7.

Time gap 13.1 is allocated to FCH search of cell A, which is performed by the first SIM 6, which stores the identifier 17.1. Time gap 14.1 is allocated to SCH reading of cell A which is performed by the first SIM 6, which stores the identifier 17.1. Time gap 14.2 is allocated to SCH reading of cell D which is performed by the second SIM 7, which stores the identifier 18.1. Time gaps 13.2 and 13.3 are allocated to FCH search of cell E, which is performed by both first SIM 6 and second SIM 7, which respectively store the identifier 17.3 and 18.3. Time gap 14.3 is allocated to SCH reading of cell E, which is performed by both first SIM 6 and second SIM 7, which respectively store the identifier 17.3 and 18.3. Time gap 14.4 is allocated to SCH reading of cell B, which is performed by the first SIM 6, which stores the identifier 17.2. Time gap 14.5 is allocated to SCH reading of cell C, which is performed by the second SIM 7, which stores the identifier 18.2.

Given that cell E is common to first SIM 6 and second SIM 7, SCH reading and FCH search by a SIM can be exploited by the other SIM.

Concerning the System Information block decoding (BCCH), it is noted that it can be used for mobility management in idle mode by providing a list of the neighbouring cells of the HPLMN according to embodiments of the invention and it provides the paging configuration. Thus, based on a combination of the reselection procedure, which is based on reception power level and on System Information reading, and the knowledge of the paging block configuration, the delay to receive a MT call or to emit a MO call on the second SIM 7 can be reduced, when a communication is released on the first SIM 6. In some embodiments, the SI is read every 30 seconds for the serving cell 2 and every 300 seconds for the neighbouring cells 2.1-2.3, in idle mode. On single-SIM products, in communication modes, the SI block is not decoded, and the network orders the serving cell change by performing a Hand Over procedure. Embodiments of the invention proposes to perform the SI block reading and decoding for the second SIM 7 neighbouring and serving cells 2, 2.1-2.3 during a communication on the first SIM 6.

According to embodiments of the invention, the BCCH block reading and decoding can be performed by using existing gaps in the time gaps allocated to communication on the first SIM 6, using time gaps between discontinuous communication bursts in downlink and uplink on the first SIM 6 or by pre-empting communication time gaps allocated to the first SIM 6.

In the following, it is considered that a BCCH block is transmitted in four normal bursts, which are broadcasted on four contiguous TDMA frames. However, embodiments of the invention can be implemented, even by considering a different transmission protocol for the BCCH block. The BCCH block comprises a System Information, which can be of several types, each type being defined in the specification 3GPP.TS 45.002§6.3.1.3. Each type of SI can be broadcasted in BCCH block positions, with a given periodicity, for example a periodicity of 204 TDMA frames for type SI3.

In the following, for the sake of better understanding, the type SI3 is considered. However, embodiments of the invention can be applied to any SI type, with a different periodicity. For example, embodiments of the present invention can be applied to type SI2, for which the periodicity is of 408 TDMA frames.

In some configurations, for example depending on the reception power level and the interference level, the decoding of the BCCH block can be achieved when receiving less than four bursts of the BCCH block. Moreover, in these configurations, any combination of bursts may be sufficient for the PU 9 of the device 1 to decode the block. For example, by considering a BCCH block transmitted via a first, a second, a third and a fourth bursts, the PU 9 can successfully decode the BCCH block upon reception of the second and fourth bursts or upon the reception of the second and third bursts. It is also noted that, for a given SI type, bursts from different BCCH block positions can be used to decode the BCCH block. Thus, a first burst of a first BCCH block position can be used in combination with a third burst of a second BCCH block position, for a given SI type.

Such a partial decoding capability can be used in any of the three ways of BCCH block decoding in order to enhance BCCH block insertion and in order to reduce potential effects on the communication quality of the first SIM 6.

In some embodiments, the BCCH block reading and decoding can be performed by using existing communication time gaps. Indeed, if there is no conflict between the first SIM 6 communication activities and the second SIM 7 BCCH block reading, the second SIM 7 activities can be added without any drawbacks in terms of BCCH block decoding delay and of communication quality for the first SIM 6.

Referring to FIG. 3.*c*, there is shown a timing diagram, in which time gaps have been allocated to BCCH burst reading 25.1-25.4. As previously explained, several BCCH block positions of a BCCH block are periodically transmitted within the network via four BCCH bursts. Depending on the quality reception level, a given number of BCCH bursts have to be received to decode the System Information. In this example, BCCH bursts are transmitted in four contiguous TDMA frames 20. Time gaps can be allocated in the TDMA frames for the first BCCH burst reading 25.1, for the second BCCH burst reading 25.2, for the third BCCH burst reading 25.3 and for the fourth BCCH burst reading 25.4. All these activities 25.1-25.4 are performed at the second SIM 7 level. To enhance the insertion of these activities, the power measurements 24 can be moved in the TDMA frames 20 by allocating new time gaps, for example time gaps that are comprised between communication reception bursts 21 and communication transmission bursts 22 on the first SIM 6. Thus, a maximum of four consecutive BCCH bursts can be read within a four TDMA frame period without any BCCH block delay degradation and without impacting on the communication on the first SIM 6. In some embodiments, in case of good reception level, less than four BCCH burst readings (for example only burst readings 25.1 and 25.3) are required to decode the system information.

Figure 4:
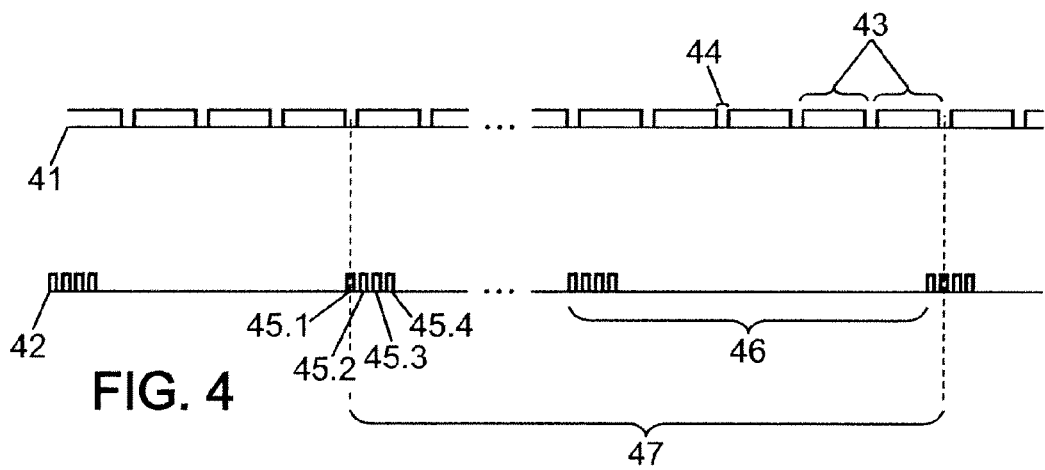
FIG. 4 illustrates two timing diagrams, in parallel, respectively representing the communication activities on the first Subscriber Identity and the transmissions of BCCH bursts by a PLMN base station for a System Information of a given type over the network.

Even in case of physical conflict between communication on the first SIM 6 and BCCH reading on the second SIM 7, embodiments of the invention manages to allocate time gaps to receive BCCH block bursts for the second SIM 7. Indeed, referring to FIG. 4, there is shown two timing diagrams in parallel, a first timing diagram 41 representing the communication activities on the first SIM 6 and a second timing diagram 42 representing the transmissions of BCCH bursts by a PLMN base station for a System Information of a given type over the network, and which can also be considered as BCCH reading opportunities from the point of view of the second SIM 7. In the example described hereafter, the type of system information SI3, with a periodicity of 204 TDMA frames, is considered. The BCCH block is composed of a first burst 45.1, a second burst 45.2, a third burst 45.3 and a fourth burst 45.4.

According to the type of communication mode for the first SIM 6, one or several TDMA frames can be free. On FIG. 4, such empty TDMA frames 44 are periodically spaced. For example, in case of a 26-multiframe sequencing configuration, there is one empty TDMA frame 44 every time period 46, which equals 26 TDMA frames 20. According to some embodiments of the invention, these empty TDMA frames 44 can be used as BCCH reading opportunities.

Thus, one BCCH burst 45.1-45.4 of a BCCH block position can be read with a periodicity of one time duration 47, which equals 5530 TDMA frames for this given SI type and for this specific example, assuming that 5530 corresponds to the last common multiple between the free TDMA frame period of 26 TDMA frames and the period between two consecutive bursts 45.1-45.4 of the given SI type, which equals 205 TDMA frames in this example (by considering a periodicity of 204 TDMA frames for the type SI3 and by considering consecutive bursts, as first burst 45.1 and second burst 45.2 for example). However, the BCCH bursts 45.1-45.4 can be read in any order according to embodiments of the invention, only requiring supplementary calculations of the least common multiple as previously explained.

Thus, the DSDS device 1 can acquire at most four different BCCH bursts 45.1-45.4 from different BCCH block positions of a same BCCH block (as they are periodically broadcasted over the network), all of them carrying the same System Information. As previously stated, in some embodiments, the PU 9 of the DSDS device 1 can decode the BCCH block on the basis of less than four received BCCH bursts 45.1-45.4.

According to the 3GPP GSM recommendations, the time duration 47 of 5330 TDMA frames 20 can be 24.6 seconds. Therefore, to read four BCCH bursts of type SI3 and thus to receive and decode a BCCH block for the second SIM 7 during first SIM 6 communication, about one and a half minute suffices.

In some embodiments, to accelerate the decoding of several BCCH blocks for different SI types, the method according to embodiments of the invention can be carried in parallel for several BCCH blocks. To this end, the PU 9 can progressively store demodulated bursts 45.1-45.4 for different SI types and can attempt BCCH block decoding of a given St type as soon as two BCCH bursts 45.1-45.4 of a same BCCH block are received. The DSDS device 1 can comprise a memory adapted to temporarily store BCCH burst reading results, according to the number of different SI types that are considered.

Such embodiments do not impact on the communication flow quality of the first SIM 6.

In some embodiments, the BCCH block reading and decoding can also be performed by using time gaps between discontinuous communication bursts in downlink and uplink on the first SIM 6, when there is a physical conflict between communication on the first SIM 6 and SI reading on the second SIM 7. Such embodiments are based on dynamic time gaps in the TDMA frames 20, which are due to discontinuous transmission in downlink and uplink on the first SIM 6. Indeed, during communication on the first SIM 6, a user of the DSDS device 1 does not continuously speak. If Discontinuous Transmission (DTX) mode is activated on the DSDS device 1, time gaps are available within a block of time gaps allocated to receive communication reception bursts 21 and to transmit communication transmission bursts 22 on the first SIM 6. The DTX mode enables to transmit and receive only speech data during communication. Thus, during communication, people do not speak continuously thus generating free time gaps within communication reception 21 and communication transmission 22 on the first SIM 6. These free time gaps can be allocated for receiving BCCH block positions.

Time gaps that are allocated to communication reception 21 and communication transmission 22 are translated in Radio Frequency (RF) transmission time gaps for uplink and downlink by the base band unit 8. DTX detection can be performed by the PU 9 just after the RF communication reception 21 in downlink or just before the RF communication transmission 22 in uplink.

Figure 5A:
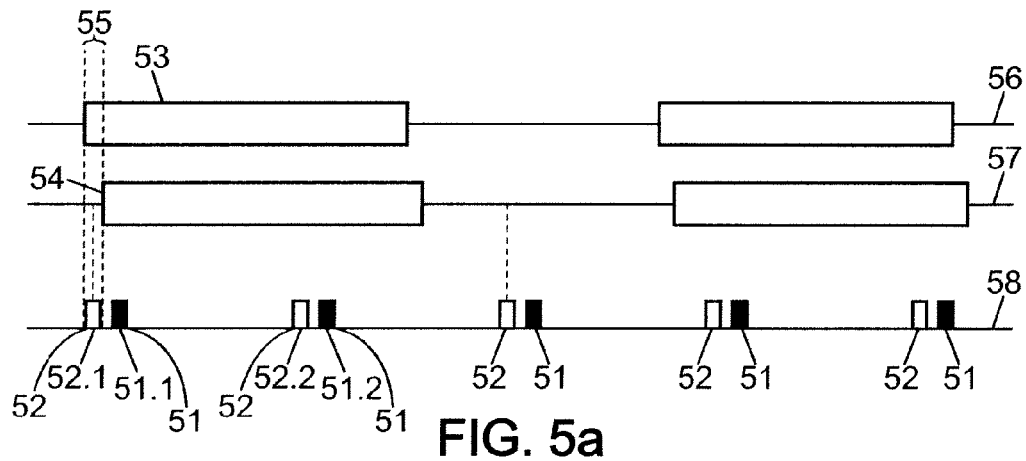
FIG. 5.a represents three timing diagrams respectively representing a user discontinuous audio speech on the micro phone of the DSDS device, uplink DTX communication on the first Subscriber Identity and transmissions of BCCH blocks for a first SI type and for a second SI type by a neighbouring cell of the second Subscriber Identity.
Figure 5B:
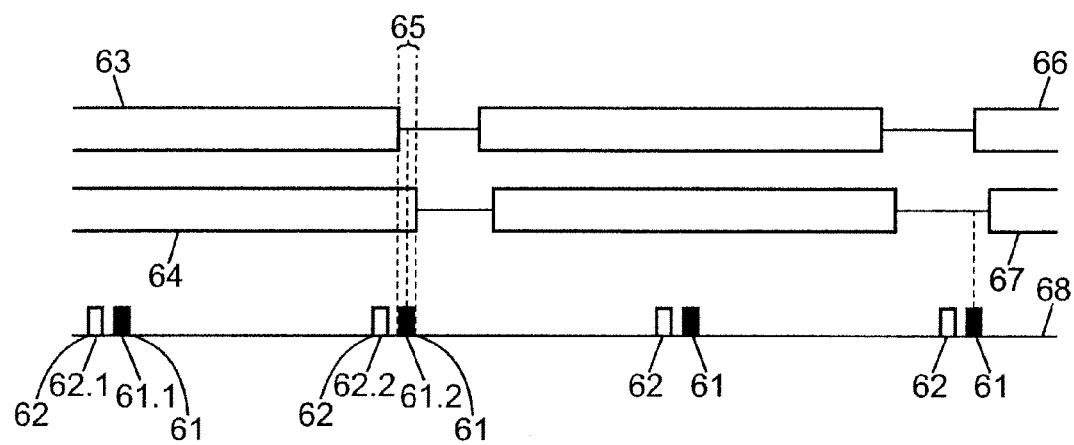

Referring to FIG. 5.a, there is shown three timing diagrams 56, 57 and 58 in parallel. The timing diagram 56 represents a user discontinuous audio speech on the micro phone 12 of the DSDS device 1, the timing diagram 57 represents uplink DTX communication on the first SIM 6 and the timing diagram 58 represents the transmissions of BCCH block positions for a BCCH block of a first SI type 51 and for a BCCH block of a second SI type 52 by a neighbouring cell of the second SIM 7. It is noted that the timing diagrams illustrated on FIG. 5.a are temporally comprised within block of time gaps which are allocated to communication transmission on FIGS. 3.a-3.c (case of a physical conflict between communication on the first SIM 6 and SI block reading).

A translation period 55 is required by the PU 9 to translate a speech data burst 53 in RF speech data burst 54. As previously explained, in DTX mode, the timing diagram 57 is not composed of a continuous RF speech data burst 54 during the communication period on the first SIM 6. Thus, time gaps are available corresponding to time gaps during which RF speech data is not transmitted.

In addition, each BCCH block of a given SI type 52 or 51 is repetitively broadcasted at a specific BCCH block position in GSM time counter according to the 3GPP GSM recommendations. For example, the first SI type 51 is transmitted at a first BCCH block position 51.1 and at a second BCCH block position 51.2. The second SI type 52 is transmitted at a first BCCH block position 52.1 and at a second BCCH block position 52.2. Therefore, the scheduling of a BCCH block reading is programmed in advance. It is noted that in the example illustrated on FIG. 5.a, the two different types of SI are broadcasted on the TDMA network with the same periodicity. However, as previously explained, SI types can be broadcasted with different periodicities.

DTX gap positions, meaning available time gaps between two RF speech data bursts 54, are unpredictable. Thus, a BCCH block reading attempt can be re-scheduled if no time gap is available during the transmission of a BCCH block 52 or 51 at a given BCCH block position by the neighbouring cell.

On FIG. 5.a, a BCCH block reading can be performed for the first BCCH block position 52.1 for the second SI type, insofar as there are available time gaps between RF speech data bursts 54, due to discontinuity in uplink communication, even if there is a conflict between the first BCCH block position 52.1 and the speech data burst 53.

In that case, the PU 9 knows whether or not the DSDS device 1 is about to transmit uplink RF speech data. Therefore, a second SIM 7 BCCH block reception can be scheduled by default by the DSP. In any case, uplink communication on the first SIM 6 is not affected by BCCH block reading, given that a time gap is physically available or, if not, the BCCH block reading is re-scheduled.

Referring to FIG. 5.*b*, there is shown three timing diagrams 66, 67 and 68 in parallel. The timing diagram 66 represents downlink DTX communication on the first SIM 6, the timing diagram 67 represents a discontinuous audio speech on the loud speaker 11 of the DSDS device 1 and the timing diagram 68 represents the transmissions of BCCH blocks for a first SI type 61 and for a second SI type 62 by the serving cell of the second SIM 7. It is noted that the timing diagrams illustrated on FIG. 5.*b* are temporally comprised within block of time gaps which are allocated to communication reception on FIGS. 3.*a*-3.*c* (case of a physical conflict between communication on the first SIM 6 and SI block reading).

A translation period 65 is required by the PU 9 to translate a RF speech data burst 63 in speech data burst 64 to be displayed by the loud speaker 11 of the DSDS device 1. As previously explained, in DTX mode, the timing diagram 66 is not composed of a continuous RF speech data burst 63 during the communication period on the first SIM 6. Thus, time gaps are available corresponding to time gaps during which RF speech data is not received.

In addition, each BCCH block of a given SI type 62 or 61 is repetitively broadcasted at a specific BCCH block position in GSM time counter according to the 3GPP GSM recommendations. For example, the first SI type 61 is transmitted at a first BCCH block position 61.1 and at a second BCCH block position 61.2. The second SI type 62 is transmitted at a first BCCH block position 62.1 and at a second BCCH block position 62.2. Therefore, the scheduling of a BCCH block reading is programmed in advance. It is noted that in the example illustrated on FIG. 5.*b*, the BCCH block of two different types of SI are broadcasted on the TDMA network with the same periodicity. However, as previously explained, BCCH blocks of different SI types can be broadcasted with different periodicities.

DTX gap positions, meaning available time gaps between two RF speech data bursts 63, are unpredictable. Thus, a BCCH block reading attempt can be re-scheduled if no time gap is available during the transmission of a BCCH block 62 or 61 by the serving cell.

On FIG. 5.*b*, a BCCH block reading can be performed for the second BCCH block position 61.2 for the first SI type, insofar as there are available time gaps between speech data bursts 67, due to discontinuity in downlink communication, even if there is a conflict between the second BCCH block position 61.2 and the speech data burst 64.

By default, the DSDS device 1 always reads the data in downlink, in order to ensure in all the cases a seamless transition if speech restarts after a discontinuity in downlink communication.

No restriction is attached to the associations that have been previously made between uplink communication and BCCH block reading for the second SIM 7 neighbouring cell and between downlink communication and BCCH block reading for the second SIM 7 serving cell. Indeed, the same method can be applied when discontinuities in downlink communication are used to allocate time gaps for second SIM 7 neighbouring cell BCCH block reading and when discontinuities in uplink communication are used to allocate time gaps for second SIM 7 serving cell BCCH block reading.

On FIGS. 5.*a* and 5.*b*, translation periods 55 and 65 have the same width as the first BCCH block position 52.1 and the second BCCH block position 61.2, respectively. However, it is noted that the first BCCH block position 52.1 could start before the translation period 55 and finish during the translation period 55 and that the second block BCCH position 61.2 could start during the translation period 65 and finish after the translation period 65.

In some embodiments, the BCCH block reading and decoding can also be performed by pre-empting communication blocks, which is based on communication block pre-emption mechanism. This mechanism consists in temporally interrupting during several time gaps the downlink communication bursts 21 or the uplink communication bursts 22 in order to read a BCCH block, in case of physical conflict between communication on the first SIM 6 and SI block reading on the second SIM 7.

Figure 6A:
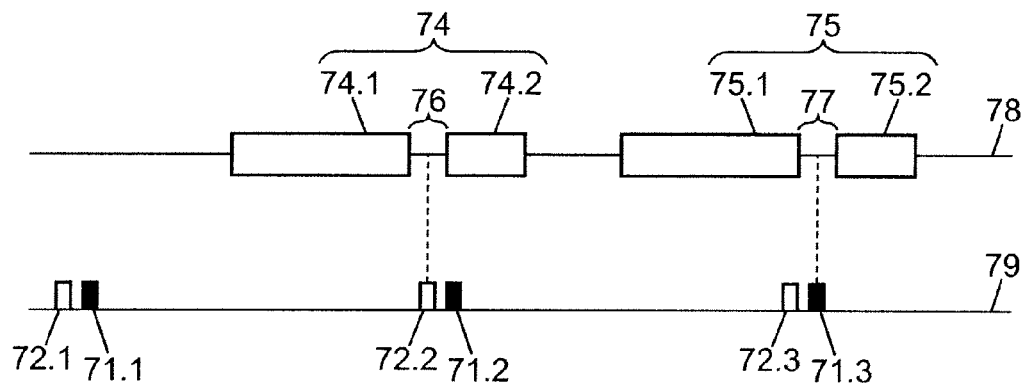
FIG. 6.a illustrates two timing diagrams respectively representing uplink DTX communication on the first Subscriber Identity and transmissions of BCCH blocks for a first SI type and for a second SI type by the neighbouring cell of the second Subscriber Identity.
Figure 6B:
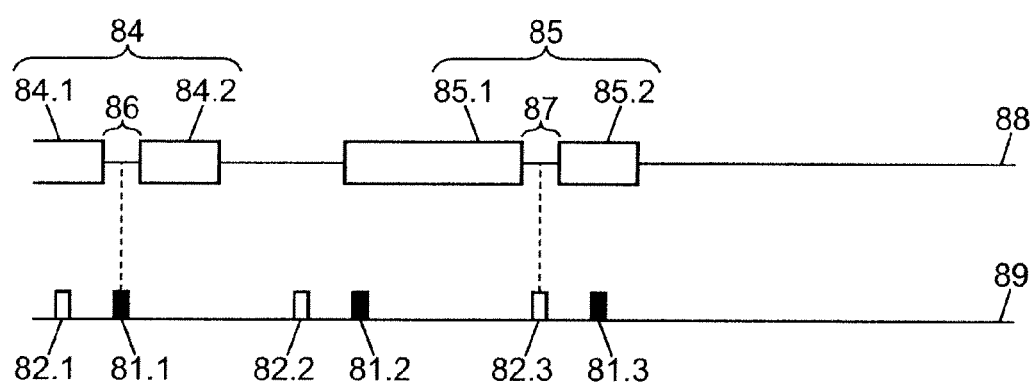

Referring to FIG. 6.*a*, there is shown two timing diagrams 78 and 79. The timing diagram 78 represents uplink DTX communication on the first SIM 6 and the timing diagram 79 represents the transmissions of BCCH blocks for a first SI type 71 and for a second SI type 72 by the neighbouring cell of the second SIM 7. It is noted that the timing diagrams illustrated on FIG. 6.*a* are temporally comprised within block of time gaps which are allocated to communication transmission on FIGS. 3.*a*-3.*c* (case of a physical conflict between communication on the first SIM 6 and SI block reading). A timing diagram representing a user discontinuous audio speech on the micro phone 12 of the DSDS device 1 has not been added on FIG. 6.*a*. However, it is assumed that the translation made by the PU 9 complies with the description of FIG. 5.*a*.

As previously explained, in DTX mode, the timing diagram 78 is not composed of a continuous RF speech data burst during the communication period on the first SIM 6 but is composed of several communication bursts 74 and 75.

Each BCCH block of a given SI type 72 or 71 is repetitively broadcasted at a specific BCCH block position in GSM time counter according to the 3GPP GSM recommendations. For example, the first SI type 71 is transmitted at a first BCCH block position 71.1, at a second BCCH block position 71.2 and at a third BCCH block position 71.3. The second SI type 72 is transmitted at a first BCCH block position 72.1, at a second BCCH block position 72.2 and at a third BCCH block position 72.3. Therefore, the scheduling of a BCCH block reading is programmed in advance. It is noted that in the example illustrated on FIG. 6.*a*, the BCCH blocks of two different types of SI are broadcasted on the TDMA network with the same periodicity. However, as previously explained, BCCH blocks of different SI types can be broadcasted with different periodicities.

According to such embodiments, time gaps initially used for uplink DTX communication on the first SIM 6 are made available by dividing communication burst 74 in two communication bursts 74.1 and 74.2 and by dividing communication burst 75 in two communication bursts 75.1 and 75.2. An interruption period 76 is then created between communications bursts 74.1 and 74.2 and an interruption period 77 is also created between communication bursts 75.1 and 75.2. The available time gaps comprised within the suspension period 76 are used to read the second BCCH block position 72.2 of the second SIM7 associated with the second SI type and the available time gaps comprised within the suspension period 77 are used to read the third BCCH block position 71.3 of the second SIM7 associated with the first SI type.

Referring to FIG. 6.*b*, there is shown two timing diagrams 88 and 89. The timing diagram 88 represents downlink DTX communication on the first SIM 6 and the timing diagram 89 represents the transmissions of BCCH blocks for a first SI type 81 and for a second SI type 82 by the serving cell of the second SIM 7. It is noted that the timing diagrams illustrated on FIG. 6.*b* are temporally comprised within block of time gaps which are allocated to communication reception on FIGS. 3.*a*-3.*c* (case of a physical conflict between communication on the first SIM 6 and SI block reading). A timing diagram representing a user discontinuous audio speech on the loud speaker 11 of the DSDS device 1 has not been added on FIG. 6.*b*. However, it is assumed that the translation made by the PU 9 complies with the description of FIG. 5.*b*.

It is noted that according to these last embodiments, the DTX mode is not required to allocate time gaps for BCCH block reading, insofar as time gaps are created during communication on the first SIM 6. Thus, FIGS. 6.*a* and 6.*b* have been represented in DTX mode for illustrative purpose exclusively.

Each BCCH block of a given SI type 82 or 81 is repetitively broadcasted at a specific BCCH block position in GSM time counter according to the 3GPP GSM recommendations. For example, the first SI type 81 is transmitted at a first BCCH block position 81.1, at a second BCCH block position 81.2 and at a third BCCH block position 81.3. The second SI type 62 is transmitted at a first BCCH block position 82.1, at a second BCCH block position 82.2 and at a third BCCH block position 82.3. Therefore, the scheduling of a BCCH block reading is programmed in advance. It is noted that in the example illustrated on FIG. 6.*b*, the BCCH blocks of two different types of SI are broadcasted on the TDMA network with the same periodicity. However, as previously explained, BCCH blocks of different SI types can be broadcasted with different periodicities.

According to such embodiments, time gaps initially used for downlink DTX communication on the first SIM 6 are made available by dividing communication burst 84 in two communication bursts 84.1 and 84.2 and by dividing communication burst 85 in two communication bursts 85.1 and 85.2. An interruption period 86 is then created between communications bursts 84.1 and 84.2 and an interruption period 87 is also created between communication bursts 85.1 and 85.2. The available time gaps comprised within the suspension period 86 are used to read the first BCCH block position 81.1 of the second SIM 7 associated with the first SI type and the available time gaps comprised within the suspension period 87 are used to read the third BCCH block position 82.3 of the second SIM7 associated with the second SI type.

Durations of the interruption periods 76, 77, 86 and 87 depend on the needed burst number for a successful BCCH block decoding. Indeed, less than four BCCH bursts may be sufficient to decode the System Information (for example in case of good reception level and low interference level). The advantage of such a mechanism is that a BCCH block of a given SI type can be decoded at a predictable date without latency. However, a Mean Opinion Score (MOS), meaning a numerical graduation of an audio quality for the communication on first SIM 6, can be degraded.

No restriction is attached to the associations that have been previously made between uplink communication and BCCH block reading for the second SIM 7 neighbouring cell and between downlink communication and BCCH block reading for the second SIM 7 serving cell. Indeed, the same method can be applied to create time gaps in downlink communication in order to allocate time gaps for second SIM 7 neighbouring cell BCCH block reading and to create time gaps in uplink communication in order to allocate time gaps for second SIM 7 serving cell BCCH block reading.

Thus, depending on specific criteria, it is possible to alternate between the three allocations mechanisms (using existing communication time gaps, using discontinuous transmission in downlink and uplink and pre-empting communication blocks). For example, if a limited delay to execute an activity (BCCH block reading) is prefixed, the fastest mechanism can be selected, that is to say pre-empting communication blocks, insofar as the duration of the BCCH block reading can be predicted. According to some embodiments, if a high priority is accorded to first SIM 6 communication, using existing communication time gaps might enable to ensure a fixed delay for reading a BCCH block, without degrading the quality of the communication on the first SIM 6. This mechanism can also be favoured in case of a high number of successive scheduling failures due to high priority first SIM 6 communication activity conflict. Another criterion can be the number of the second SIM 7 activities to perform. No restriction is attached to the type of criterion considered according to embodiments of the invention.

Figure 7:
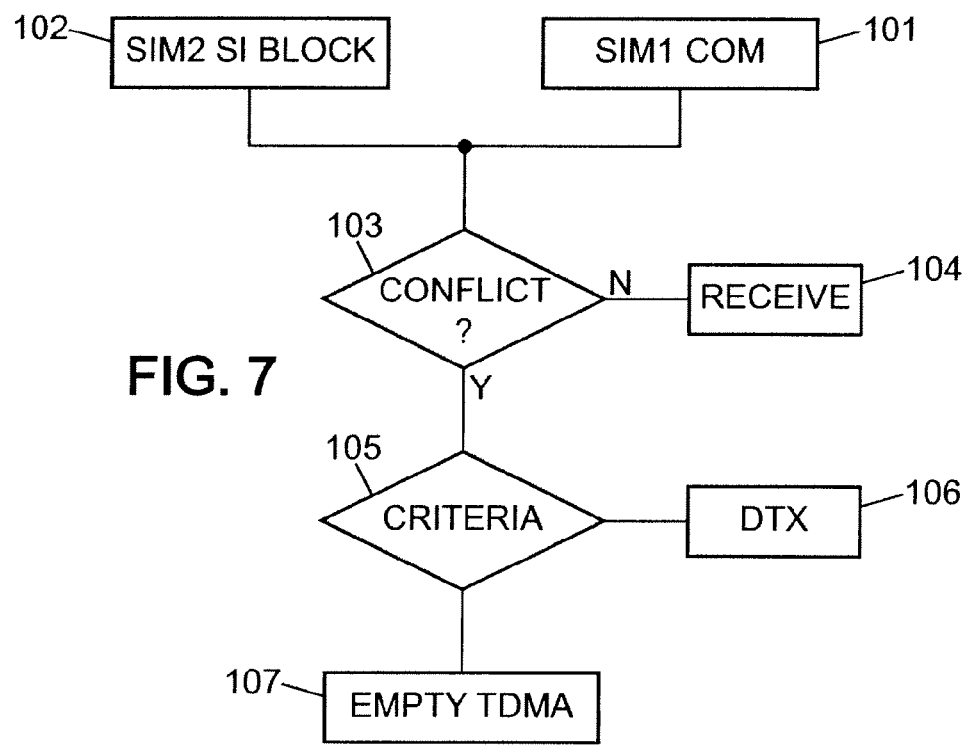
FIG. 7 illustrates a flowchart representing steps of a method according to some embodiments of the invention.

Referring to FIG. 7, there is shown a flowchart representing steps of a method according to some embodiments of the invention.

At step 101, communication activities are performed on the first SIM 6. Step 101 is performed in parallel to all the other steps of the method according to embodiments of the invention. During communication on first SIM 6, time gaps are allocated in TDMA frames to receive and transmit communication data on the first SIM 6.

At step 102, BCCH blocks are broadcasted over the network by one or several PLMN base stations 2, 2.1-2.3 in the form of BCCH block positions, each BCCH block position comprising four bursts, and are perceived by PU 9 as SI block reading opportunities. As previously explained, the BCCH block positions can be periodically broadcasted with a given period depending on the SI type. Step 102 is also performed in parallel to all the other steps of the method.

At step 103, the PU 9 can determine whether or not there is a physical conflict between time gaps allocated to first SIM 6 communication and second SIM 7 SI block reading.

If not, at step 104, time gaps can be allocated in TDMA frames to receive at least one burst of a BCCH block position without deterring the quality of communication on the first SIM 6. When a sufficient number of bursts has been received, the BCCH block is decoded to retrieve the SI.

If there is a physical conflict, the PU 9 can refer to different criteria in step 105 in order to select one way of allocating time gaps to receive a burst of a SI block position, according to some embodiments of the invention.

For example, time gaps can be allocated to receive at least one burst of a BCCH block position at step 106 by using discontinuities in first SIM 6 communication. Then, depending on the relative priority between first SIM 6 communication and BCCH block reading, the communication on the first SIM 6 can be temporally interrupted or the BCCH block reading can be re-scheduled, in case of physical conflict during reception or transmission of communication data for the first SIM 6. When a sufficient number of bursts has been received, the BCCH block is decoded to retrieve the SI.

Alternatively, one TDMA frame can be periodically empty at step 107 in the TDMA structure and empty TDMA frames can be used to allocate time gaps to receive at least one burst of a BCCH block position comprised in an empty TDMA frame without impacting on the quality of the first SIM 6 communication. When a sufficient number of bursts has been received, the BCCH block is decoded to retrieve the SI.

Concerning the downlink quality monitoring, as defined by the 3GPP GSM recommendations, this activity is based on a Downlink Signalling Counter (DSC) handling on each paging block reading on the serving cell of a SIM.

A Downlink Signalling Failure (DSF) event can be triggered if several consecutive paging blocks are badly decoded during five seconds.

For example, for paging block badly decoded, the DSC can be decremented by four. The DSC counter can be initialized at a specific value according to the paging block periodicity to fit the 3GPP GSM recommendations.

For each paging block correctly decoded, the DSC is incremented by one until upper limit corresponding to the initial value.

When the DSC reaches a given threshold, a DSF event can be triggered.

The DSF event can be used to force a quick reselection or to trigger a HPLMN 2 neighbourhood cell coverage research, to determine a new serving cell. If no new serving cell is found, the SIM is considered in "No service", meaning no access to the HPLMN 2, or "Limited Service", meaning possible access on other PLMN base stations 2.1-2.3 than the HPLMN base station of the SIM operator usable in case of emergency call.

In good network coverage, a reselection procedure based on power level monitoring on the serving cell and on the neighbouring cells avoids having too many consecutive paging block decoding failures and thus avoids triggering a DSF event.

According to embodiments of the invention, any of four possible parameters can be used to trigger the DSF event, either alone or in combination:
  the DSC value
  the reception power level;
  the SCH decoding; and
  the BCCH block decoding.

In some embodiments, any one of, or any combination of two or more of, the four possible parameters can be used to trigger the DSF event.

All these activities have been previously described with reference to other embodiments of the invention. However, it is noted that the downlink quality monitoring refers to an independent object of embodiments of the invention.

Figure 8:
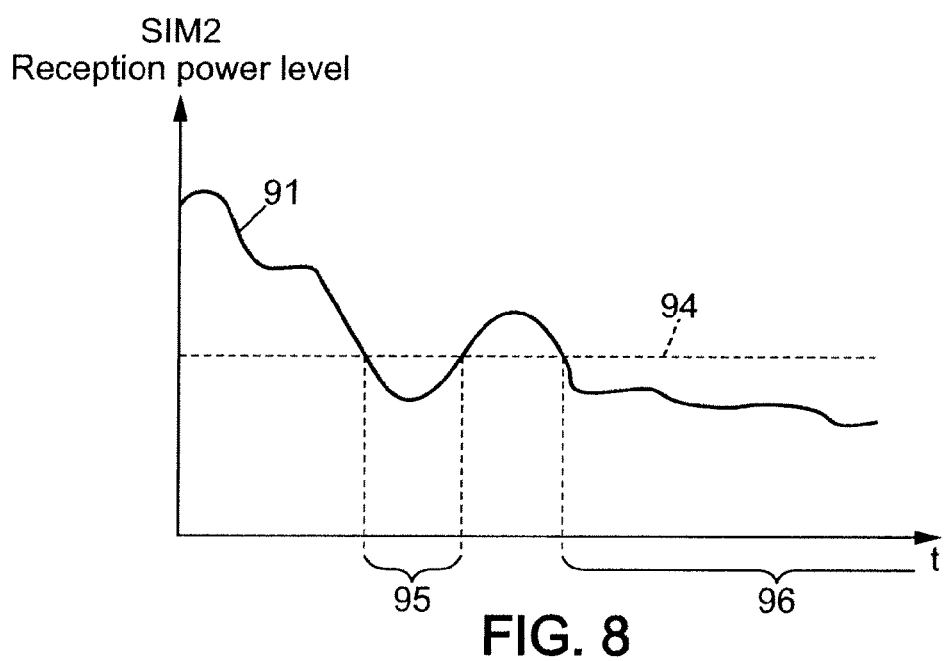
FIG. 8 is a curve representing reception power level value for the second Subscriber Identity HPLMN base station versus time.

According to some embodiments of the invention, a sensitive power level can be used as the threshold for the DSF detection. If for a given duration, the reception power level is below this threshold and if no neighbouring cell provides a better reception level, a DSF event can be triggered. Referring to FIG. 8, there is shown a curve 91 representing reception power level value for the second SIM 7 HPLMN base station 2 versus time. A power level threshold 94 and a given duration are prefixed. When curve 91 is above the threshold value, the reception power level is sufficient and no DSF event is to be triggered. Then, the curve 91 is below the power level threshold 94 during a first period 95 and then exceeds the power level threshold 94. First period 95 is smaller than the given duration so that no DSF event is triggered. However, when curve 91 is below the power level threshold 94 during a second period 96, which is greater than the given duration, a DSF event can be triggered. Thus, embodiments of the invention ensure that a DSF event trigger is relevant and depends on reception power level of the second SIM 7 HPLMN base station 2.

According to some embodiments, a SCH reading result can be the criterion for triggering a DSF event. The SCH is coded on one burst, as illustrated on FIG. 2, and is broadcasted with a high rate. For example, five SCH can be broadcasted every fifty one TDMA frames, i.e. 0.23 second. If a given number of successive SCH reading attempts are badly decoded, a DSF event can be triggered according to some embodiments of the invention. The SCHs can be read during first SIM 6 communication time gaps and thus, are not necessarily consecutive.

According to some embodiments of the invention, a DSF event can be triggered based on BCCH block reading. In idle mode, a set of several BCCH blocks has to be read every 30 seconds.

In order to be close to the DSF event triggering based on paging block reading, a rate of BCCH block reading for the second SIM 7 HPLMN base station 2 can be increased.

To avoid affecting the second SIM 7 serving cell and neighbouring cell activities and the performance of the first SIM 6 communication, SCH reading can be used in priority to trigger a DSF event, according to some embodiments of the invention. The 30-second BCCH reading of the second SIM serving cell can be used as a substitute of the SCH-reading method during a duration corresponding to SI reading. The three methods for triggering a DSF event can be used dynamically depending on a physical activity load for example.

Thus, an object of embodiments of the invention is a method for triggering a Downlink Signalling Failure event on a device comprising at least a first Subscriber Identity and a second Subscriber Identity, the first Subscriber Identity being in communication mode, a serving cell being associated with the second Subscriber Identity, characterized in that a DSF event is triggered based on a predefined criterion depending on a parameter relating to the second Subscriber Identity serving cell.

According to some embodiments, a threshold and a given duration being predefined, the DSF event is triggered if a second Subscriber Identity serving cell reception power level is below the threshold during a period greater than the given duration.

According to some embodiments, a maximum number of SCH reading attempts being predefined, the DSF event is triggered if a number of second Subscriber Identity serving cell SCH reading failures reaches the maximum number.

Concerning the serving cell reselection handling for the second SIM 7, this activity can be performed as specified in the 3GPP GSM recommendations based on the reception level of the serving cell and of the neighbouring cells.

Thus, some advantages of embodiments of the present invention are that several procedures and methods can be performed in order to keep the synchronization between the device and the serving cell 2 of the second SIM 7 during mobility while the first SIM 6 is in communication. As previously stated, the different embodiments can be selected according to the following criteria:
  a number of second SIM 7 activities to perform;
  a required periodicity of the second SIM 7 activities;
  a limited delay to execute a second SIM 7 activity;
  a number of successive scheduling failures due to high priority first SIM communication activity conflict;
  a type of communication configuration;
  a required quality level for the first SIM 6 communication.

Embodiments of the present invention guarantee a low delay to be able to initiate a MO call or to answer to a MT call on the second SIM 7 after the first SIM 6 communication release.

Embodiments of the present invention can also be embedded in a computer program product, which comprises all the features enabling the implementation of the methods described herein, and which—when loaded in an information processing system—is able to carry out these methods. Computer program means or computer program in the present context mean any expression, in any language, code or notation, of a set of instructions intended to cause a system having an information processing capability to perform a particular function either directly or after conversion to another language. Such a computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

Embodiments of the invention have been described above in detail with reference to embodiments thereof. However, as is readily understood by those skilled in the art, other embodiments are equally possible within the scope of the present invention, as defined by the appended claims.

For instance, the order of the first and second subscriber identities, SIM cards, mobile communication networks and controller nodes does not have to be identical to the order disclosed but may on the contrary be reversed.

Also, even though the first and second subscriber identities reside in local memory areas of SIM cards which are physically inserted into corresponding SIM card readers in the DSDS mobile terminal in the disclosed embodiments, this must not be the case in alternative embodiments. In such alternative embodiments, one or both of the first and second subscriber identities may be provided to the mobile terminal in the form of a SIM software application executed in the terminal, and/or as a virtual SIM which is "stolen" or "borrowed" from another device and is rendered accessible to the terminal, for example, by way of a wireless interface or a serial interface.

It is further to be noticed that the invention also embraces embodiments with three or even more different subscriber identities/SIM cards in a single mobile terminal.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, some embodiments of the present invention may not include all of the features described above. Therefore, it is intended that the present invention not be limited to the particular embodiments disclosed, but that the invention include all embodiments falling within the scope of the invention as broadly defined above.

A person skilled in the art will readily appreciate that various parameters disclosed in the description may be modified and that various embodiments disclosed and/or claimed may be combined without departing from the scope of the invention.

The invention claimed is:

1. A method of scheduling the reception of at least one System Information block by a mobile device associated with at least a first Subscriber Identity, and a second Subscriber Identity, said System Information block being intended to the second Subscriber Identity and being broadcasted with a first periodicity over a network by at least one base station of the network in the form of a plurality of bursts, according to a given frame structure having Time Division Multiple Access, TDMA, frames, each TDMA frame comprising a plurality of time gaps, first time gaps of respective first TDMA frames being allocated to a communication activity on the first Subscriber Identity, at least one burst of the System Information block being broadcasted over the network during a second time gap of a second TDMA frame, wherein if one of the first TDMA frames and the second TDMA frame are one and the same TDMA frame within the frame structure and if the second time gap is comprised between two consecutive first time gaps dedicated to the communication activity on the first Subscriber Identity, then the method comprises allocating said second time gap of the second TDMA frame to receive the burst of the System Information block for the second Subscriber Identity during the communication activity on the first Subscriber Identity.

2. The method according to claim 1, wherein at least a third TDMA frame comprises at least one third time gap allocated to power measurements on the second Subscriber Identity and on the first Subscriber Identity, and
    if the third TDMA frame and the second TDMA frame are one and the same TDMA frame and if the second time gap and the third time gap are the same within said TDMA frame, then another time gap is allocated to power measurements in said TDMA frame to allow allocating the second time gap to receive the burst of the System Information block.

3. The method according to claim 1, wherein the frame structure comprising one empty TDMA frame sent periodically, if one of the first TDMA frames and the second TDMA frame are one and the same TDMA frame and if the first time gap and the second time gap are the same within said TDMA frame, then another burst of the System Information block is broadcasted over the network during at least a fourth gap of an empty TDMA frame and the fourth time gap of the empty TDMA frame is allocated to receive said other burst of the System Information block.

4. The method according to claim 1, wherein a discontinuous communication mode being activated on the device so that first time gap is actually used for communication only when communication data is received or transmitted on the first Subscriber Identity, if one of the first TDMA frames and the second TDMA frame are one and the same TDMA frame and if the first time gap and the second time gap are the same within said TDMA frame, then the second time gap of said TDMA frame is allocated to receive the burst of the System Information block if no communication data is received or transmitted for the first Subscriber Identity during the first time gap.

5. The method according to claim 4, wherein if communication data is received or transmitted for the first Subscriber Identity during the first time gap, then an allocation to receive at least another burst of the System Information block of one of the next first periods is scheduled.

6. The method according to claim 4, wherein if communication data is received or transmitted for the first Subscriber Identity during the first time gap, then communication on the first Subscriber Identity is temporally interrupted during the first time gap and the first time gap is allocated to receive the burst of the System Information block.

7. The method according to claim 4, wherein a serving base station of the network is initially associated with the second Subscriber Identity, wherein the network further comprises at least one neighboring base station, wherein communication on the first Subscriber Identity comprises data reception and data transmission, wherein a block of a prefixed size comprises at least two first time gaps being allocated in at least one of the first TDMA frames to the communication on the first Subscriber Identity, wherein the block of a prefixed size is divided in a first block and a second block, said first block comprising at least one first time gap allocated to data reception and said second block comprising at least one first time gap allocated to data transmission, and wherein an allocation to receive at least one burst of the System Information block of the serving base station is scheduled within the first block and an allocation to receive at least one burst of the System Information block of the neighboring base station is scheduled within the second block.

8. The method according to claim 1, wherein if a limited delay to receive the System Information block is prefixed, a discontinuous communication mode being activated on the device so that first time gap is actually used for communication only when communication data is received or transmitted on the first Subscriber Identity, if one of the first TDMA frames and the second TDMA frame are one and the same TDMA frame and if the first time gap and the second time gap are the same within said TDMA frame, then communication on the first Subscriber Identity is temporally interrupted during the first time gap and the first time gap is allocated to receive the burst of the System Information block.

9. The method according to claim 1, wherein if a quality level of the communication is initially required on the first Subscriber Identity, the frame structure comprising one empty TDMA sent periodically, if one of the first TDMA frames and the second TDMA frame are one and the same TDMA frame and if the first time gap and the second time gap are the same within said TDMA frame, then another burst of the System Information block is broadcasted over the network during at least a fourth time gap of an empty TDMA frame and the fourth time gap of the empty TDMA frame is allocated to receive the other burst of the System Information block.

10. The method according to claim 1, wherein, a number of bursts of a System Information block being required to decode the System Information, if a given number of System Information is badly decoded within a given third time period, then emission by the mobile device of a Downlink Signalling Failure event is triggered.

11. A processor for scheduling the reception of at least one System Information block, the processor being associated with a mobile device comprising at least a first Subscriber Identity and a second Subscriber Identity, said System Information block being intended to the second Subscriber Identity and being broadcasted with a first periodicity over a network by at least one base station of the network in the form of a plurality of bursts, according to a given frame structure having Time Division Multiple Access, TDMA, frames, each TDMA frame comprising a plurality of time gaps, first time gaps of respective first TDMA frames being allocated to a communication activity on the first Subscriber Identity, at least one burst of the System Information block being broadcasted over the network during a second time gap of a second TDMA frame, wherein the processor comprises:
    a decision unit for determining if one of the first TDMA frames and the second TDMA frame are one and the same TDMA frame within the frame structure and if the second time gap is comprised between two consecutive first time gaps dedicated to the communication activity on the first Subscriber Identity;
    an allocation unit for allocating the second time gap to receive at least one burst of a System Information block depending on the determination of the decision unit;
    a receiver unit for receiving the burst of the System Information block for the Second Identity during the communication activity on the first Subscriber Identity; and
    a decoding unit for decoding the System Information of the System Information block.

12. A mobile device for scheduling the reception of at least one System Information block, the mobile device being associated with at least a first Subscriber Identity and a second Subscriber Identity, said System Information block being intended to the second Subscriber Identity and being broadcasted with a first periodicity over a network by at least one base station of the network in the form of a plurality of bursts, according to a given frame structure having Time Division Multiple Access, TDMA, frames, each TDMA frame comprising a plurality of time gaps, first time gaps of respective first TDMA frames being allocated to a communication activity on the first Subscriber Identity, at least one burst of the System Information block being broadcasted over the network during a second time gap of a second TDMA frame, wherein the mobile device comprises:
    a processor, said processor comprising:
    a decision unit for determining if one of the first TDMA frames and the second TDMA frame are one and the same TDMA frame within the frame structure and if the second time gap is comprised between two consecutive first time slots dedicated to the communication activity on the first Subscriber Identity;
    an allocation unit for allocating the second time gap to receive at least one burst of a System Information block depending on the determination of the decision unit;
    a receiver unit for receiving the burst of the System Information block for the second Subscriber Identity during the communication activity on the first Subscriber Identity; and
    a decoding unit for decoding the System Information of the System Information block.

13. The mobile device of claim 12, wherein the mobile device is further configured to carry out the steps of a method allocating at least one third time gap within a third TDMA frame to power measurements on the second Subscriber Identity and on the first Subscriber Identity, if the third TDMA frame and the second TDMA frame are one and the same TDMA frame and if the second time gap and the third time gap are the same within said TDMA frame, then another time gap is allocated to power measurements in said TDMA frame to allow allocating the second time gap to receive the burst of the System Information block.

14. A system for scheduling the reception of at least one System Information block by a mobile device of the system, the mobile device being associated with at least a first Subscriber Identity and a second Subscriber Identity, said system further comprising at least one base station, said base station broadcasting with a first periodicity a System Information block intended to the second Subscriber Identity over a network, according to a given frame structure having Time Division Multiple Access, TDMA, frames, each TDMA frame comprising a plurality of time gaps, first time gaps of respective first TDMA frames being allocated to a communication activity on the first Subscriber Identity, at least one burst of the System Information block being broadcasted over the network during a second time gap of a second TDMA frame, wherein the mobile device comprises a processor, said processor comprising:
- a decision unit for determining if one of the first TDMA frames and the second TDMA frame are one and the same TDMA frame within the frame structure and if the second time gap is comprised between two consecutive first time slots dedicated to the communication activity on the first Subscriber Identity;
- an allocation unit for allocating the second time gap to receive at least one burst of a System Information block depending on the determination of the decision unit;
- a receiver unit for receiving the burst of the System Information block for the second Subscriber Identity during the communication activity on the first subscriber Identity; and
- a decoding unit for decoding the System Information of the System Information block.

15. A non-transitory computer readable storage medium with a program stored thereon, wherein the program comprises instructions loadable to perform the method of claim 1.

* * * * *